(12) United States Patent
Neher et al.

(10) Patent No.: US 12,736,285 B2
(45) Date of Patent: Sep. 15, 2026

(54) FREEZE DRYING INSTALLATION

(71) Applicant: SBM Schoeller Bleckmann Medizintechnik GmbH, Ternitz (AT)

(72) Inventors: Stefan Neher, Burk (DE); Daniel Cros Garcia, Liverpool (GB)

(73) Assignee: SBM Schoeller Bleckmann Medizintechnik GmbH, Ternitz (AT)

( * ) Notice: Subject to any disclaimer, the term of this patent is extended or adjusted under 35 U.S.C. 154(b) by 463 days.

(21) Appl. No.: 18/555,769

(22) PCT Filed: Apr. 13, 2022

(86) PCT No.: PCT/EP2022/059858
§ 371 (c)(1),
(2) Date: Oct. 17, 2023

(87) PCT Pub. No.: WO2022/223389
PCT Pub. Date: Oct. 27, 2022

(65) Prior Publication Data

US 2024/0210111 A1 Jun. 27, 2024

(30) Foreign Application Priority Data

Apr. 19, 2021 (DE) ..................... 10 2021 109 802.5

(51) Int. Cl.
*F26B 25/00* (2006.01)
*B25J 18/04* (2006.01)
*F26B 5/06* (2006.01)

(52) U.S. Cl.
CPC ............. *F26B 25/003* (2013.01); *B25J 18/04* (2013.01); *F26B 5/06* (2013.01)

(58) Field of Classification Search
CPC ............ F26B 25/003; F26B 5/06; B25J 18/04
(Continued)

(56) References Cited

U.S. PATENT DOCUMENTS 5,964,043 A * 10/1999 Oughton ................... F26B 5/06 34/92
7,421,801 B2 * 9/2008 Kluetsch ............... F26B 25/003 198/600

(Continued)

FOREIGN PATENT DOCUMENTS

BR 112012002813 B1 * 11/2020 ............ F26B 25/001
CN 104552247 A 5/2016

(Continued)

OTHER PUBLICATIONS

Chinese Patent Office Action for Application No. 202280036755 dated Nov. 26, 2025 (18 pages including English machine translation).

(Continued)

*Primary Examiner* — Stephen M Gravini
(74) *Attorney, Agent, or Firm* — Michael Best & Friedrich LLP

(57) ABSTRACT

The invention relates to a freeze drying installation (8), including a device (9) for moving containers (10) such as vials or the like along a surface supporting the containers to load and/or unload the containers into a freeze dryer processing chamber (200), wherein the device comprises two articulated arms, wherein each articulated arm comprises a first rigid upper arm and a first rigid lower arm connected to each other by a first rotary joint, wherein the ends of the two articulated arms are connected to a rigid transfer bar by articulated joints, which are spaced apart from each other when seen along an extension axis of the transfer bar, and wherein the two articulated arms are driven by at least one driving unit in a synchronised manner such that the transfer bar is movable along a loading and/or unloading axis to load or unload containers into or from the freeze dryer processing chamber.

12 Claims, 11 Drawing Sheets

(58) Field of Classification Search
USPC ........................................................ 34/284
See application file for complete search history.

(56) References Cited

U.S. PATENT DOCUMENTS

| | | | | |
|---|---|---|---|---|
| 7,644,558 | B1 | 1/2010 | Fallas | |
| 7,695,230 | B2 * | 4/2010 | Selch | B65G 47/82 34/236 |
| 8,534,451 | B2 * | 9/2013 | Damen | B65G 47/682 198/367 |
| 9,316,438 | B2 * | 4/2016 | Van Veen | F26B 5/06 |
| 9,796,273 | B2 * | 10/2017 | Ragazzini | B60M 7/00 |
| 11,730,839 | B2 * | 8/2023 | Kleinmann | A61L 2/087 422/22 |
| 12,109,311 | B2 * | 10/2024 | Slocum | A61K 9/19 |
| 12,379,157 | B2 * | 8/2025 | Vallet Xicoy | F26B 5/06 |
| 12,405,059 | B2 * | 9/2025 | Davis | F26B 3/04 |
| 2006/0016094 | A1 | 1/2006 | Covert | |
| 2009/0019724 | A1 * | 1/2009 | Wagner | F26B 25/001 34/284 |
| 2014/0196411 | A1 | 7/2014 | Procyshyn et al. | |
| 2019/0049181 | A1 | 2/2019 | Oprins et al. | |
| 2023/0152036 | A1 * | 5/2023 | Merz | B25J 11/00 34/284 |
| 2024/0210111 | A1 * | 6/2024 | Neher | F26B 25/001 |

FOREIGN PATENT DOCUMENTS

| | | | | | |
|---|---|---|---|---|---|
| CN | 107866803 | A | | 4/2018 | |
| CN | 108779955 | A | | 11/2018 | |
| CN | 109153468 | A | | 1/2019 | |
| CN | 109414812 | A | | 3/2019 | |
| CN | 117377855 | A | * | 1/2024 | F26B 5/06 |
| EP | 1619459 | A1 | | 1/2006 | |
| JP | 5735507 | B2 | * | 6/2015 | F26B 25/001 |
| WO | 2017158563 | A1 | | 9/2017 | |
| WO | 2017178895 | A1 | | 10/2017 | |
| WO | WO-2022223389 | A1 | * | 10/2022 | F26B 5/06 |

OTHER PUBLICATIONS

International Search Report and Written Opinion for Application No. PCT/EP2022/059858 dated Aug. 19, 2022 (8 pages).
German Patent Office Action for Application No. 10 2021 109 802.5 dated Jan. 31, 2022 (8 pages including statement of relevance).

* cited by examiner

FREEZE DRYING INSTALLATION

BACKGROUND

The invention relates to a freeze drying installation, including a device for moving containers such as vials or the like along a along a surface supporting the containers to load and/or unload the containers into a freeze dryer processing chamber.

Loading and unloading devices tend to use a large area of a cleanroom in front of a freeze drying processing chamber and are difficult to fit within the available internal volume of aseptic containment isolators. Existing solutions of loading and unloading devices are also not easily accessible through gloves if manual action is needed. Sometimes access through gloves to certain areas of these devices is simply impossible because of the long distance between the glove-ports and these areas.

Loading and unloading devices are complex mechanical devices that are difficult to clean, inspect and sterilize as required for the handling of pharmaceutical products. They often present areas that are inaccessible. Some systems use flexible bellows with inaccessible recessed areas that cannot be reached when these systems are in specific positions and in practice become not cleanable or sterilizable.

SUMMARY

The present invention resolves these problems by providing a freeze drying installation in accordance with the disclosure.

The device of the freeze drying installation is compact and able to provide a linear pushing and/or pulling movement of the transfer bar for loading or unloading containers (such as individual vials, vials in frames or trays, nests containing vials, pre-filled syringes or cartridges for freeze drying) while minimising the space taken from a cleanroom, the articulated arms and the transfer bar being compact enough to be fully contained inside an optional isolator and enabling full access to all their parts exposed to the process through gloves for easy cleaning, sterilization and inspection.

In an embodiment, the extension axis of the transfer bar extends along a straight line, facilitating the loading and/or unloading of a plurality of containers.

Preferably, the loading and/or unloading axis extends along a straight line, facilitating the loading and/or unloading of a plurality of containers.

According to a preferred embodiment, the loading and/or unloading axis is perpendicular to the extension axis of the transfer bar, providing a robust and reliable mechanism.

In particular, the transfer bar may comprise a pushing plane extending in a direction parallel to the extension axis of the transfer bar and acting in a pushing manner on a plurality of containers. In addition or in the alternative, the transfer bar may comprise additional elements (such as grippers, extended profiles, hooks or the like) acting on a plurality of containers in a pulling manner.

Preferably, the two articulated arms move in opposite directions of rotation, providing for a stable and symmetric mechanism.

Optionally, the freeze drying installation comprises a drive for the vertical displacement of the two articulated arms and of the transfer bar.

It is preferred that the two articulated arms have the same effective length facilitating a linear movement of the transfer bar and avoiding lateral or bending forces acting on the transfer bar.

Each of the two articulated arms comprises a first rigid upper arm and a first rigid lower arm connected to each other by a first rotary joint. Such articulated arms provide a simple and robust two-element linkage. The ends of such articulated arms correspond with extremes or the "wrists". These "wrists" are associated with the ends of each lower arm which are remote from the first rotary joint constituting an "elbow".

It is preferred that the upper arms of the two articulated arms have the same length and that the lower arms of the two articulated arms have the same length.

In particular, the rotation axes of all joints are parallel to each other so as to produce a planar movement of the two articulated arms and of the transfer bar in a plane which is parallel to a flat, in particular horizontal or slightly sloped supporting surface on which the containers are to be pushed or pulled along the loading and/or unloading axis.

It is preferred that—in a storage position of the articulated arms—the upper arm and the lower arm of each of the articulated arms are arranged in parallel or essentially in parallel with the extension axis of the transfer bar. Thus, a very compact footprint is achieved, wherein the two articulated arms and the transfer bar can be fully installed inside the available volume of an optional containment isolator.

According to a preferred embodiment, at least one of the articulated arms comprises a second upper arm and a second lower arm connected to each other by a second rotary joint, thus providing a quadrilateral four-element linkage which is particularly stable.

Preferably, the second upper arm is driven by the at least one driving unit (or by a further driving unit) in such a manner that the second upper arm and the first upper arm of the same articulated arm move in opposite directions of rotation.

To minimize installation space, the first upper arm is driven around a first axis and the second upper arm is driven around a second axis wherein the first axis and the second axis are concentric to each other.

According to a preferred embodiment, the articulated arms are arranged on a first side of a supporting platform, and the at least one driving unit is arranged on a second side of the supporting platform which is opposite the first side. Thus, rotary only movements on the first side of the supporting platform will facilitate the integration of the freeze drying installation in pharmaceutical applications for safe handling of aseptic and/or toxic products. In particular, the first side is void of bellows and of telescope devices protected by bellows.

In particular, locating the at least one driving unit underneath the supporting platform of the loader and outside the process area will enable repairs without compromising containment and sterility in the process area of the freeze dryer above the supporting platform while protecting the product which is located in the process area. In the same way, when toxic products are handled, the configuration of the freeze drying installation protects operators and maintenance technicians from being exposed. The location of at least one driving unit underneath the supporting platform avoids the process area being contaminated with lubricants of the at least one driving unit.

With this arrangement the two articulated arms present rotary movements only, with a very clean design for sterile processing, easy cleaning and sterilization and can be located inside a classified pharmaceutical process area. The driving unit or units can be physically isolated at the opposite side of the separation provided by the supporting platform and therefore are free from the restrictions applying to the process area.

The supporting platform not only provides a physical separation of the two articulated arms from their driving unit or units but also has the purpose of providing a structural support for the two articulated arms.

In particular, the above mentioned first side is part of a classified process area (such as a cleanroom) and the above mentioned second side is outside of the classified process area.

BRIEF DESCRIPTION OF THE DRAWINGS

The invention can be better understood and implemented by looking at the drawings that show an illustrative but not limitative example form of embodiment, wherein:

FIG. 9 shows a perspective view of the freeze drying installation in a first step where the loading and unloading device has produced a single line of containers over infeed conveying means, wherein a line of vials is ready to be pushed towards the inside of the process chamber;

FIG. 10 shows a perspective view of the freeze drying installation of FIG. 9 in a second step where the line of containers has been pushed towards the process chamber by the loading and unloading device, wherein the loading and unloading device is shown in the retracted storage position after the push and ready to receive the next line of containers;

FIG. 11 shows a perspective view of the freeze drying installation of FIGS. 9 and 10 after several lines of containers have been partially loaded;

FIG. 13 shows a perspective view of the freeze drying installation of FIGS. 9 to 12 in its final step of the loading operation, wherein the loading and unloading device is fully extended to transfer a full pack of containers onto a standing platform inside the process chamber and wherein a pack of vials now fills the full standing platform to its full capacity; and FIG. 14 shows a perspective view of the freeze drying installation of FIGS. 9 to 13 in the transition between completing the loading of one standing platform and starting the loading of the next. The fully loaded standing platform moves away vertically and the next empty standing platform is positioned for loading. The loading and unloading device is fully retracted in its storage position to receive containers once again.

DETAILED DESCRIPTION

Figure 1:
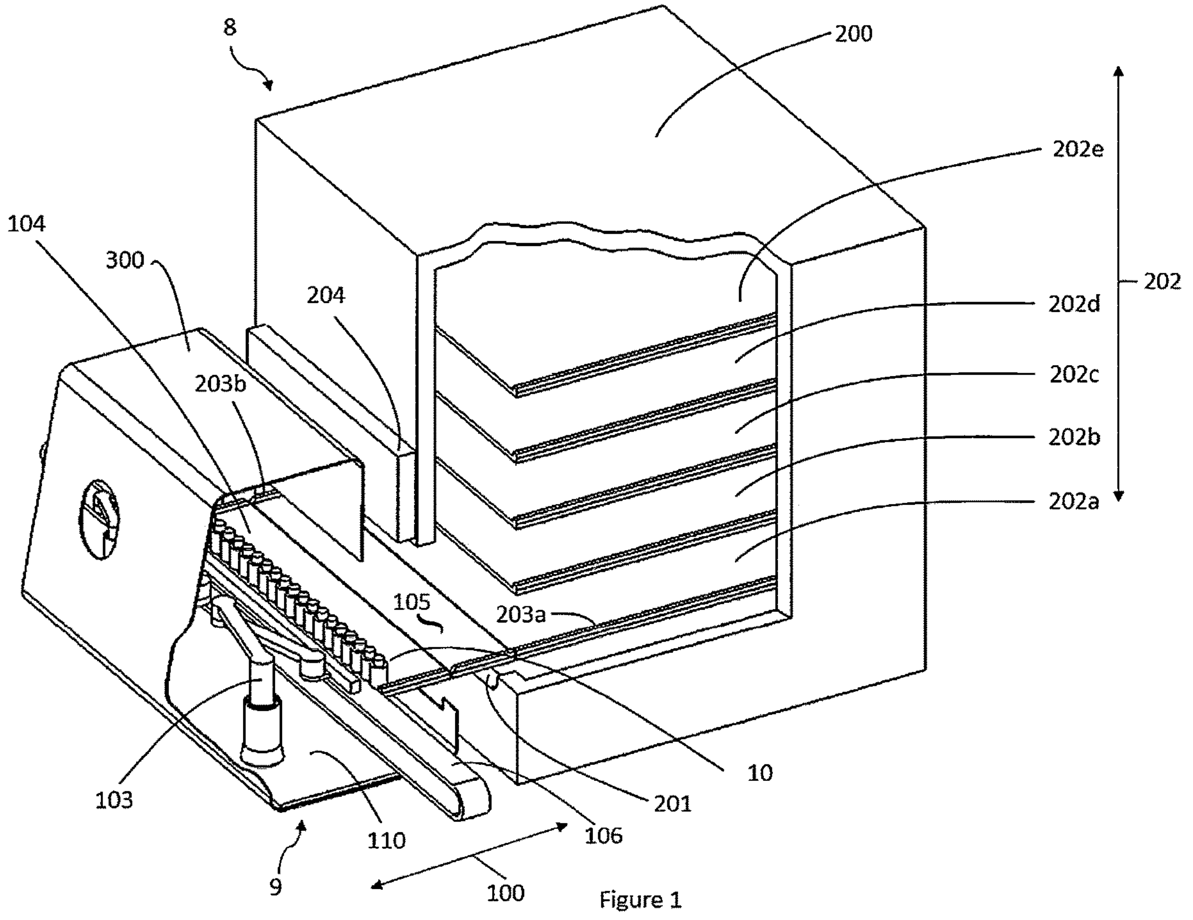
FIG. 1 shows a perspective view of an embodiment of a freeze drying installation including a loading and unloading device integrated inside a containment isolator and shown in its storage position.

In the drawings, a freeze drying installation is generally designated with reference numeral 8. The freeze drying installation comprises a loading and unloading device 9 which is referred to as "device 9" in the following description.

A freeze drying process chamber of the freeze drying installation 8 is designated with reference numeral 200. As shown in FIG. 1 the process chamber 200 contains at least one standing platform 202*a* or a plurality of standing platforms being arranged in form of a stack 202 and comprising represented—by way of example—five platforms designated as 202*a*, 202*b*, 202*c*, 202*d* and 202*e*. Each standing platform 202*a* to 202*e* is provided on opposite sides with lateral guiding means 203*a* to contain containers 10 from falling through the sides of the standing platforms 202*a* to 202*e* as they are pushed onto them by means of the device 9 which is arranged in an area 100 outside of the process chamber 200.

The process chamber 200 contains at least one opening 201 that can be closed and sealed by means of a moveable door 204. The opening 201 remains open during loading and unloading and door 204 closes and seals it for processing.

The device 9 preferably comprises a fixed buffer platform 104, a moveable bridging platform 105 and conveying means 106. Guiding means 203*b* aligned with guiding means 203*a* are also present on two opposite sides of platforms 104 and 105. In a specific embodiment, parts of the device 9 are mounted onto a supporting platform 110 and integrated inside a containment isolator 300.

Figure 2:
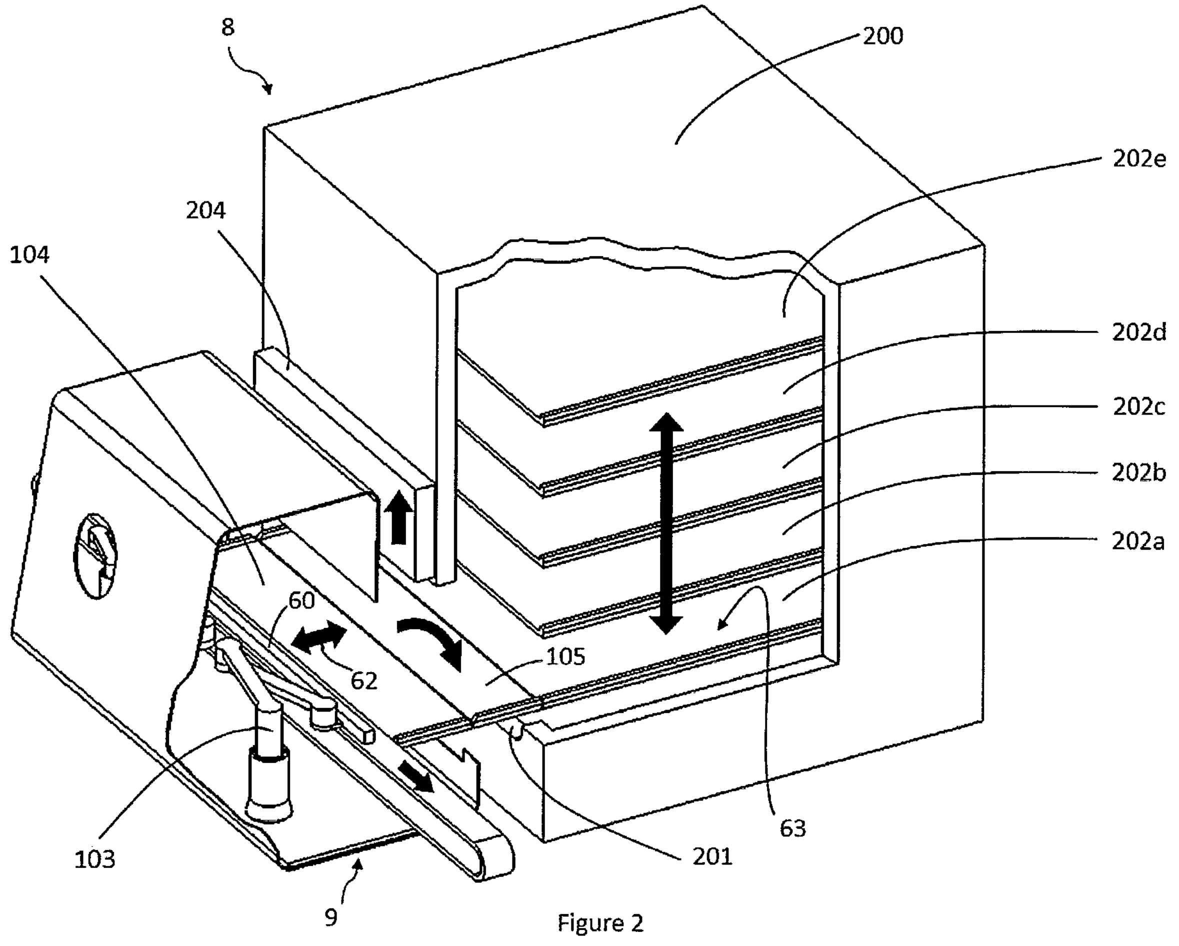
FIG. 2 shows a perspective view of the installation of FIG. 1 with arrows indicating the movements of different elements of the freeze drying installation, wherein a chamber opening is shown in an open position and wherein a bridging platform is extended to connect in a single and continuous horizontal surface a buffering platform belonging to the loading and unloading device and a standing platform located inside a process chamber.

FIG. 2 indicates movements for some of the elements of the embodiment described here:

a transfer bar 60 belonging to the device 9 moves in a straight-line displacement along a horizontal loading and/or unloading axis 62 parallel to the flat platforms 104, 105 and 202*a*, parallel to the lateral guiding means 203 and perpendicular to the opening 201 of the process chamber 200.

Buffer platform 104 is stationary. It does not move.

Bridging platform 105 is shown moving with a rotary movement hinged against buffer platform 104. This is just an example of how this platform could move.

The chamber door 204 is shown moving vertically to free opening 201 of process chamber 200. Again this type of movement is just an exemplification.

Standing platforms 202*a*, 202*b*, 202*c*, 202*d* and 202*e* move vertically so they can be accurately positioned one by one in line with the conveyor means 106, buffering platform 104 and bridging platform 105.

Process chamber 200 and containment isolator 300 are both stationary.

FIG. 2 shows door 204 in open position and bridging platform 105 in extended position as it collaborates with buffer platform 104 and standing platform 202*a* to generate a single continuous horizontal surface 63 where containers 10 can be supported and moved along. The surface 63 thus represents a supporting surface.

Figure 3:
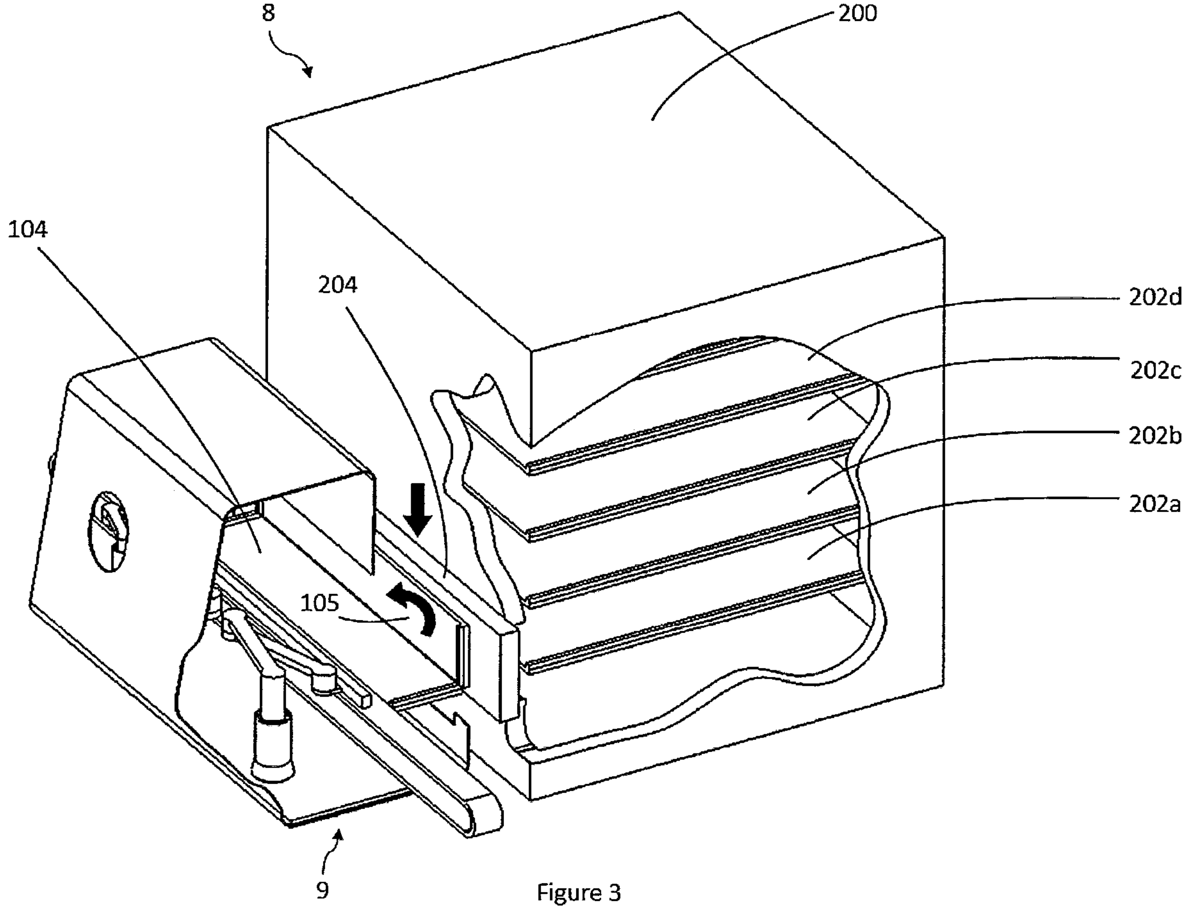
FIG. 3 shows a perspective view of the installation of FIGS. 1 and 2 but now with the bridging platform being retracted to permit closing of the chamber opening (shown in a closed position)

FIG. 3 shows the same elements as FIG. 2 but now door 204 is closed and bridging platform 105 is retracted to free the gap for door 204 to close.

Figure 4:
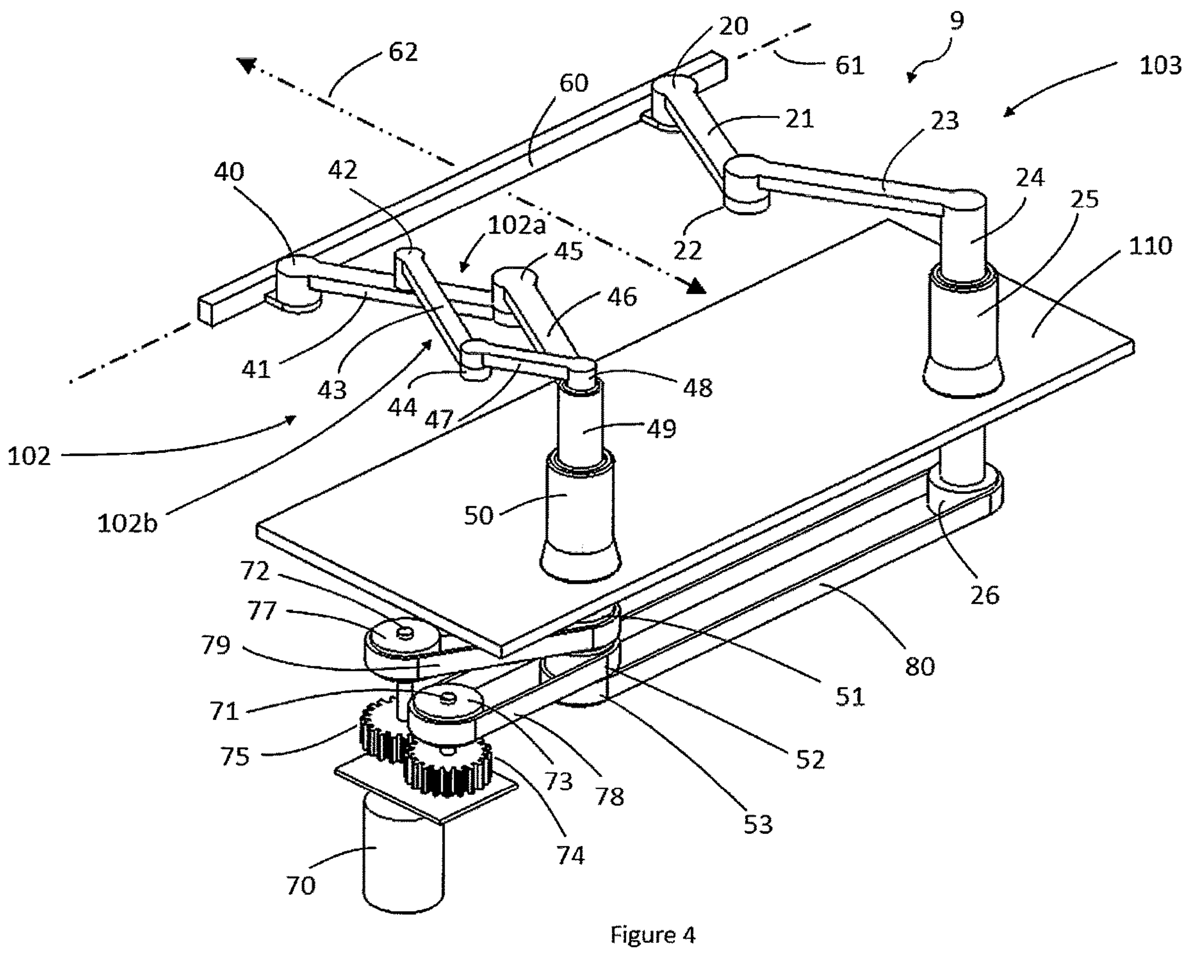
FIG. 4 shows a perspective view of the loading and unloading device of the installation of FIG. 1, wherein the loading and unloading device is in an extended position.
Figure 5:
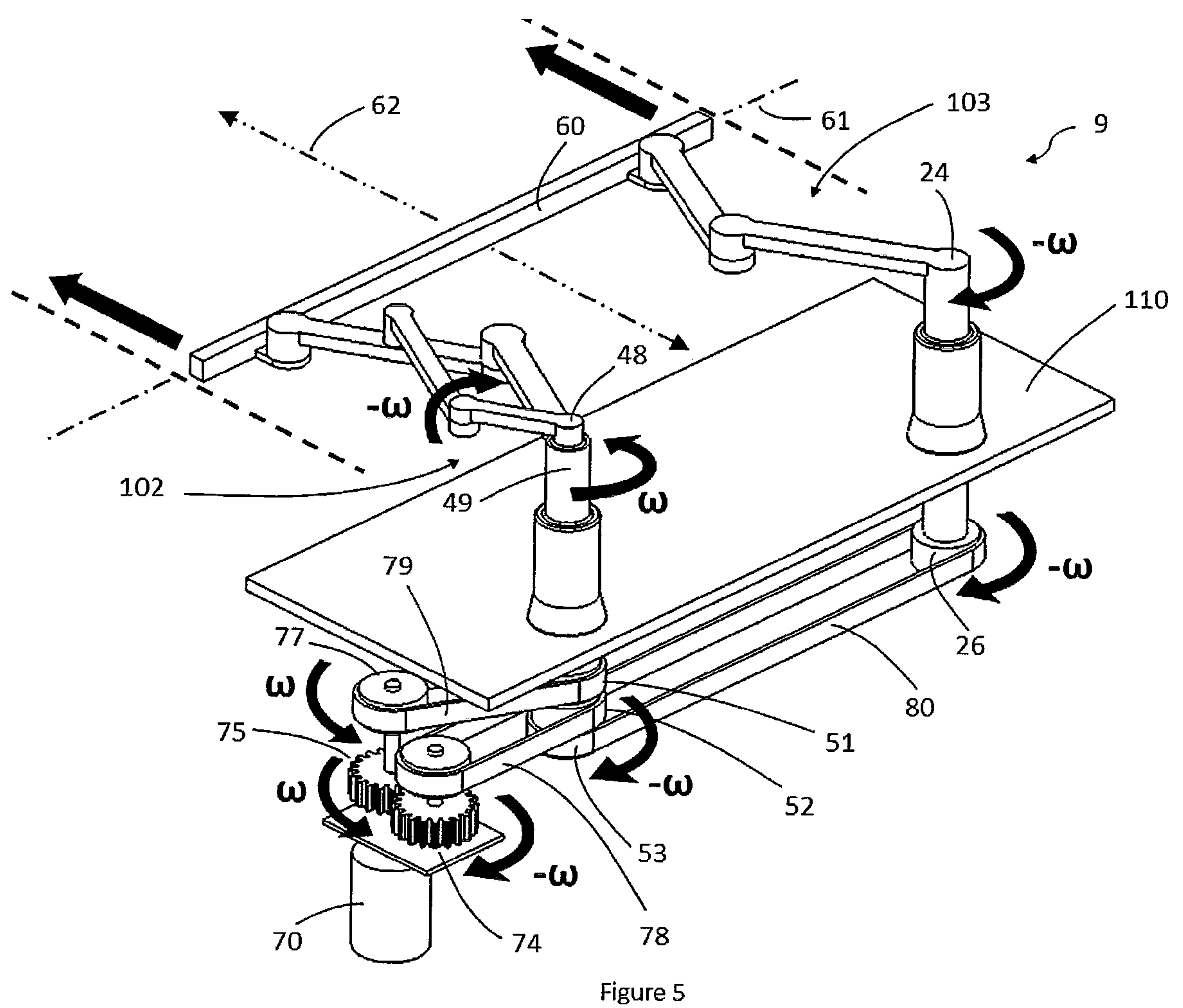
FIG. 5 shows a perspective view in accordance with FIG. 4 with arrows indicating the directions of movement of the main elements required to move from a retracted to the extended position, wherein retracting of the device is achieved by reversing these directions of movement.
Figure 6:
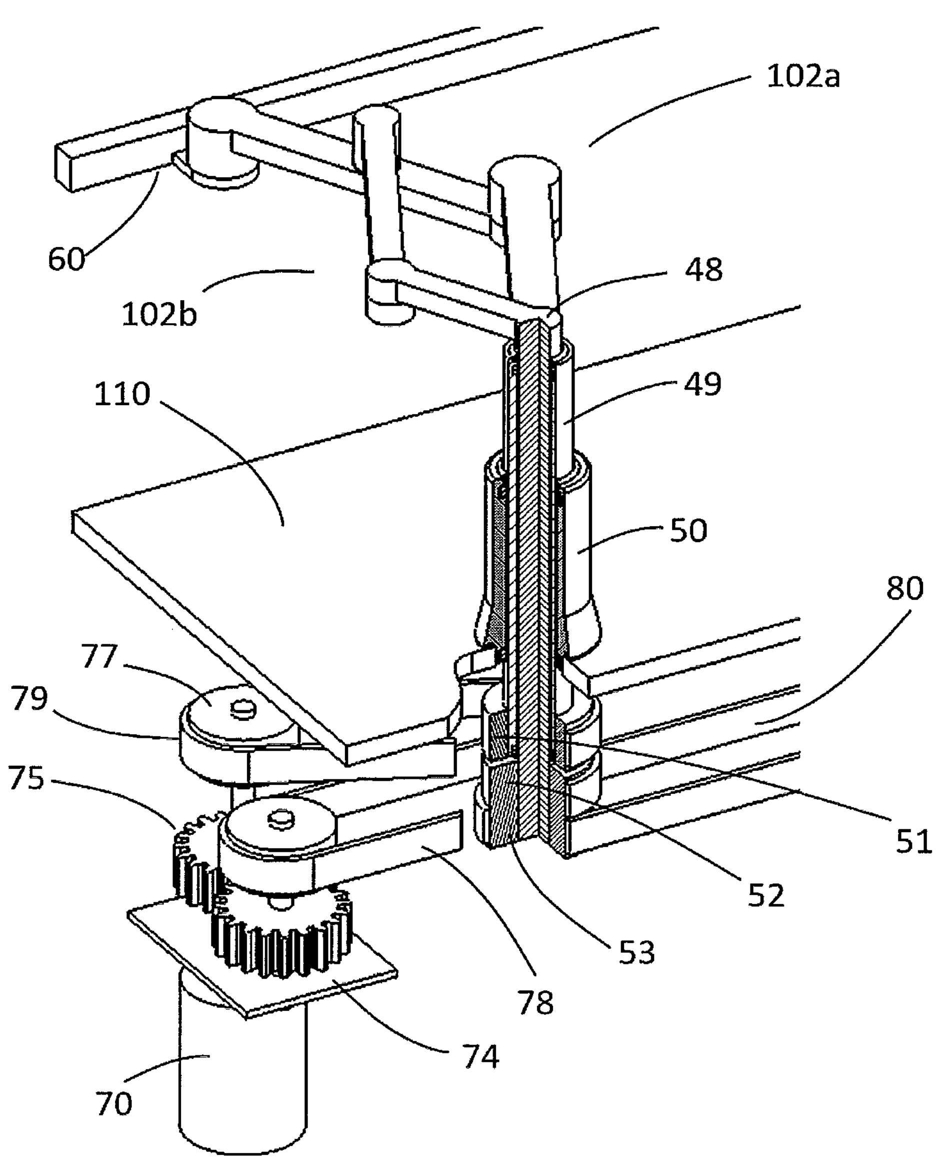
FIG. 6 shows a cross-sectional view of a four-link articulated arm and of a driving unit of the loading and unloading device of the freeze drying installation.
Figure 7:
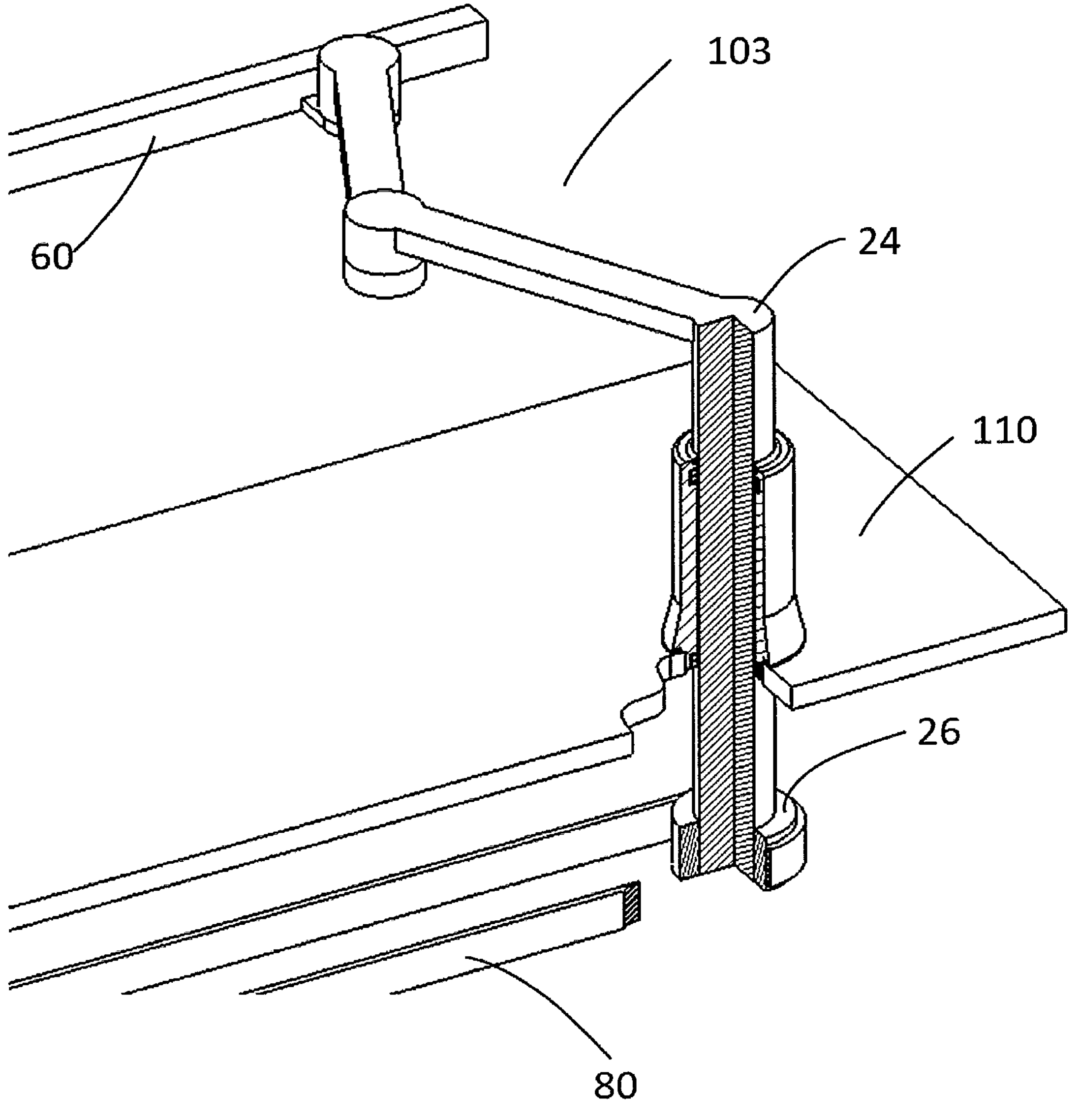
FIG. 7 shows a cross-sectional view of a two-link articulated arm and of the driving unit of the loading and unloading device of the freeze drying installation.

FIGS. 4 and 5 show perspective views of the device 9 including a driving unit 70 used to move and synchronise movements of two articulated arms 102 and 103. FIG. 6 shows a detailed cross-sectional view of articulated arm 102 and its sub-arms 102*a* and 102*b*. FIG. 7 shows a detailed cross-sectional view of articulated arm 103.

A preferred embodiment of the invention includes as shown in FIGS. 4 and 5 a driving unit 70 such as an electrical motor to move the arms 102 and 103 as well as power means to transfer the rotation of the driving unit 70 to shafts 48, 49 and 24 and synchronise their rotation. Driving unit 70 moves a shaft 72 which has attached a timing pulley 77 or equivalent power transfer element and a gear wheel 75. As shaft 72 rotates, its rotation is transferred to gear wheel 75 and to pulley 77. Pulley 77 then transfers rotation to shaft 49 belonging to articulated arm 102 and in particular to its sub-arm 102*a* by means of a timing belt 79.

The gear wheel 75 collaborates with a gear wheel 74 to transfer the rotation of the shaft 72 to a shaft 71 while reversing the direction of rotation for shaft 71. Shaft 71 rotates in opposite direction to shaft 72.

Shaft 71 has a timing pulley 73 attached to it. Pulley 73 transfers the rotation from shaft 71 to timing pulley 52 by means of a timing belt 78. Pulley 52 is attached to shaft 48 belonging to the sub-arm 102*b* of articulated arm 102.

In an embodiment where timing pulleys 51, 52, 73 and 77 are identical and gear wheels 74 and 75 are also identical to each other, the rotation speed of the driving unit 70 is directly transferred to shaft 49 that rotates at the same speed and the same direction as the driving unit 70. On its side the rotation of the driving unit 70 is also directly transferred to shaft 48, which rotates at the same rotational speed as the driving unit 70 and shaft 49, but in opposite direction. Shafts 49 and 48 now rotate at identical speed but in opposite directions, and so do their corresponding extensions of a first upper arm 46 and a second upper arm 47. First upper arm 46 of articulated arm 102 and a first upper arm 43 of articulated arm 103 are identical in length. A distance between a first rotary joint 45 and an articulation 42 is identical to the length of second upper arm 47. With this configuration and as shown in FIGS. 4 and 5, as upper arms 47 and 46 rotate in opposite directions and identical speed, a second rotary joint 44 of sub-arm 102*b* and the first rotary joint 45 of sub-arm 102*a* transfer movement to corresponding lower arms 43 and 41 producing a straight-line displacement of an articulated joint 40 at the end of the articulated arm 102.

In an embodiment, shaft 48 has attached beside timing pulley 52 another timing pulley 53. Pulley 53 rotates together with shaft 49 and pulley 52. Pulley 53 connects to pulley 26 by means of a timing belt 80 and transfers the rotation of shaft 49 to shaft 24 belonging to the articulated arm 103. In an embodiment, timing pulleys 53 and 26 are identical and therefore rotating speed and direction of rotation from shaft 49 is directly transferred to shaft 24, attached to pulley 26 and belonging to the articulated arm 103.

Articulated arm 103 is identical in lengths as sub-arm 102*a* of articulated arm 102. The articulated arm 103 comprises a first upper arm 23, a first rotary joint 22 and a first lower arm 21. At the end of the first lower arm 21, a rotary joint 20 connects the articulated arm 103 with the transfer bar 60.

As shaft 24 rotates exactly at the same speed as shaft 49 and in opposite direction, articulated arms 102*a* and 103, which are both connected with one articulated joint 40, 20 to transfer bar 60, describe identical rotational movements in opposite directions.

As shown in FIG. 5, when the driving unit 70 rotates in a particular direction at angular speed w, first arm 47 and second arm 23 rotate synchronised exactly at the same speed w, while first arm 46 rotates also synchronised at exactly the same rotational speed but in opposite direction (−w). This produces a straight-line displacement of joints 20 and 40 and as a result a straight-line displacement of transfer bar 60 along the loading and/or unloading axis 62. The straight-line linear displacement of transfer bar 60 is produced by means of rotary movements only of the linkage system of the two articulated arms 102 and 103.

Figure 8:
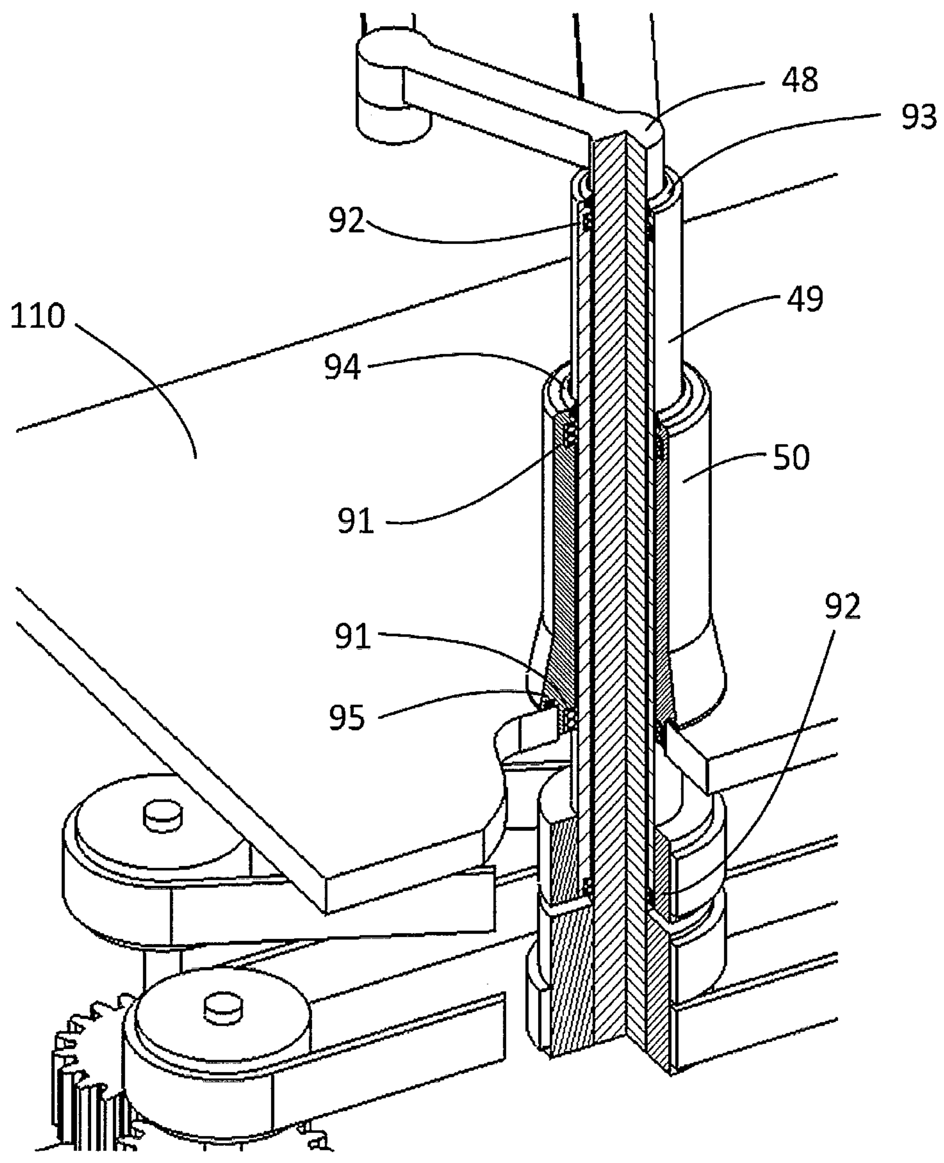
FIG. 8 shows an enlarged cross-sectional view of the four link articulated arm of FIG. 6 with details of rotary bearings between concentric rotary shafts and gaskets providing a leak tight seal between a process area and a technical area located respectively above and below a supporting platform which acts as a separation barrier.

In another particular aspect of the illustrative embodiment and as shown in detailed cross-sectional views in FIGS. 6, 7 and 8, supporting elements 50 and 25 of articulated arms 102 and 103 are advantageously mounted onto the horizontal supporting platform 110 in such a way that shafts 48, 49 and 24 extend through it. Shaft 49 is mounted onto the supporting element 50 by means of rotary bearings 91, while shaft 48 is mounted inside shaft 49 by means of bearings 92. Dynamic seals 93 and 94 are installed to seal the gaps between shaft 49 and 48 and between shaft 49 and body 50, while static seal 95 is used to seal the gap between support 50 and the supporting platform 110.

With this configuration replicated for shaft 26 and support 25, articulated arms 102 and 103 can be separated from the driving unit 70 and provided with a hygienic design which include articulated joints and rotary movements only. The driving unit 70, much more difficult to produce to the requirements of pharmaceutical and aseptic processing, can be kept separated on the opposite side of the supporting platform 110 and away from the pharmaceutical process area. The resulting configuration can be integrated into a containment isolator 300 where the volume of the articulated arms 102 and 103 and the transfer bar 60 above the supporting platform 110 remains inside a housing of the isolator 300, and the volume below the supporting platform 110 and containing the driving unit 70 remains outside the enclosure of the isolator 300.

FIGS. 9 to 14 show an overall representative illustration of the device 9 in different positions so as to explain the loading sequence for transferring product containers 10 from the area 100 located outside the process chamber 200 to the standing platform 202*b* located inside it.

Figure 9:
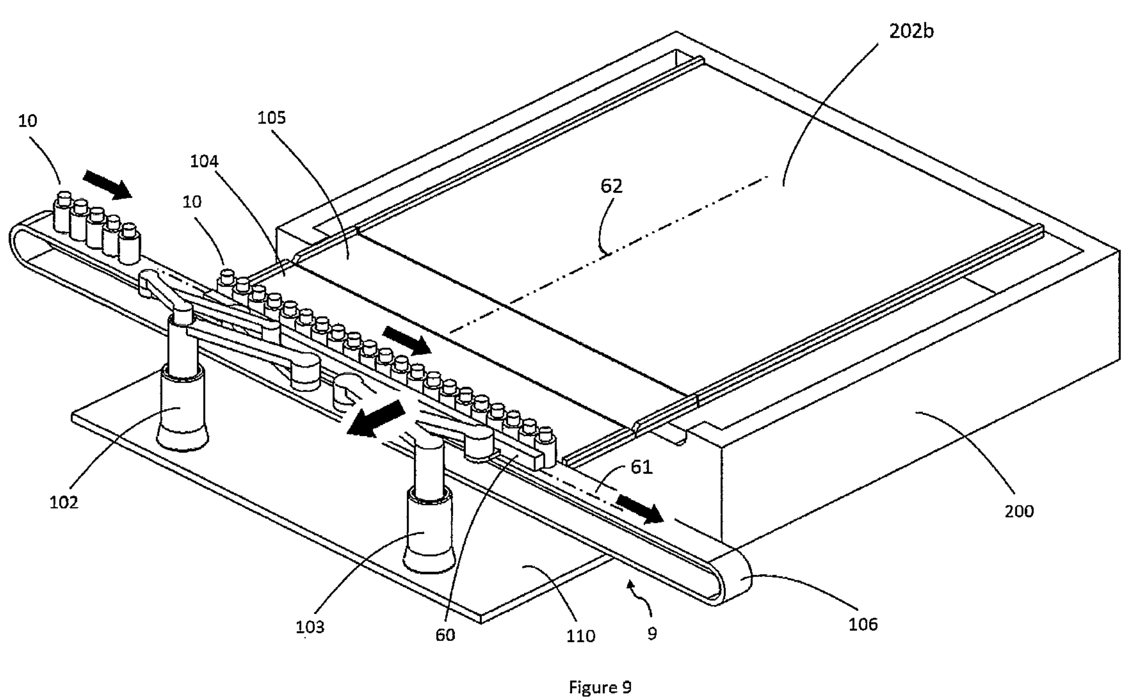
FIGS. 9, 10, 11, 13 and 14 show a sequence of movements representative of the use of the freeze drying installation to load a standing platform or a shelf of freeze dryer with containers.

FIG. 9 shows a first step of the loading sequence with the main elements involved and arrows indicating the direction of movement of these elements. Conveyor means 106 receive product containers 10 from a filling device external to the freeze drying installation 8 and transport them along a horizontal direction parallel to the chamber opening 201. Several possible means, not within the scope of this explanation, are used in between the filling machine and the conveyor means 106 to arrange containers 10 in a single line over the conveyor means 106 and parallel to its direction of movement.

Figure 10:
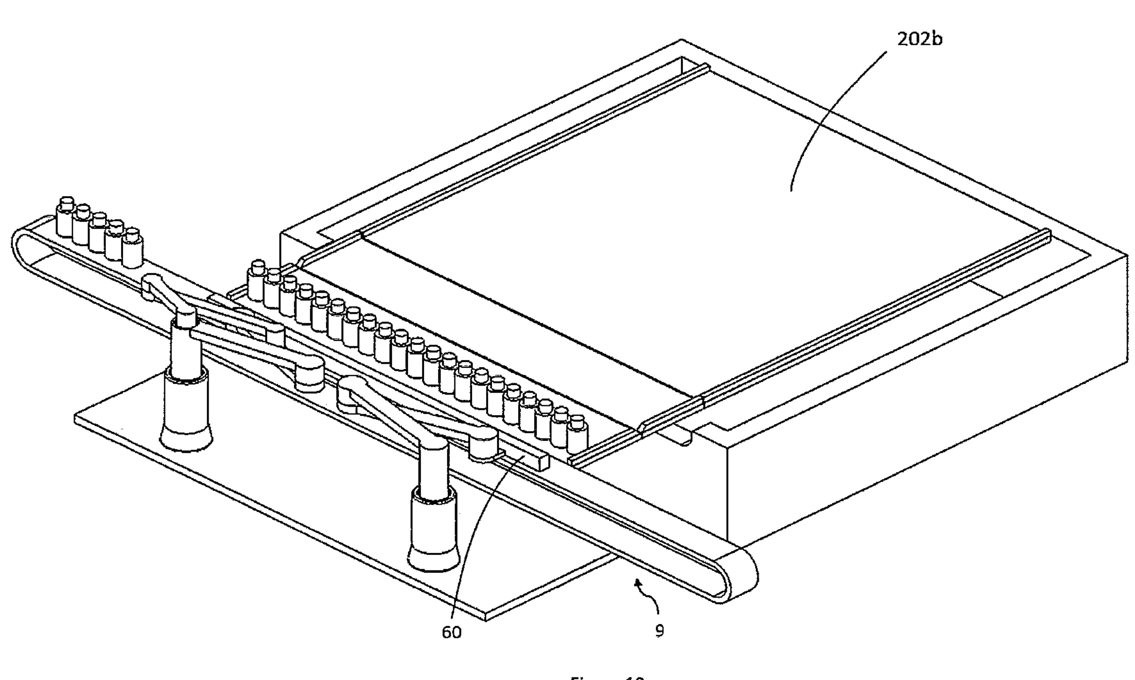

FIG. 10 shows a second step in the loading process. The single line of containers 10 brought in by conveyor means 106 is pushed towards process chamber 200. In particular as the device 9 moves forward in a short stroke, transfer bar 60 moves in along the straight loading and/or unloading axis 62 towards the inside of the process chamber 200 pushing the containers 10 from the conveyor means 106 onto the buffer platform 104. The organisation of containers 10 in a single line is maintained during this operation. Once the containers 10 have been transferred to the buffer platform 104, the device 9 retracts in another short stroke to bring transfer bar 60 to its original retracted storage position. The freeze drying installation 8 is now ready to receive the next single line of containers 10 for loading.

The process described in FIG. 10 is repeated so successive lines of containers 10 are accumulated onto the buffer platform 104, and as the process progresses, accumulated lines of containers 10 such as vials fill the buffer platform 104, the bridging platform 105 and part of the standing platform 202*b*.

Figure 11:
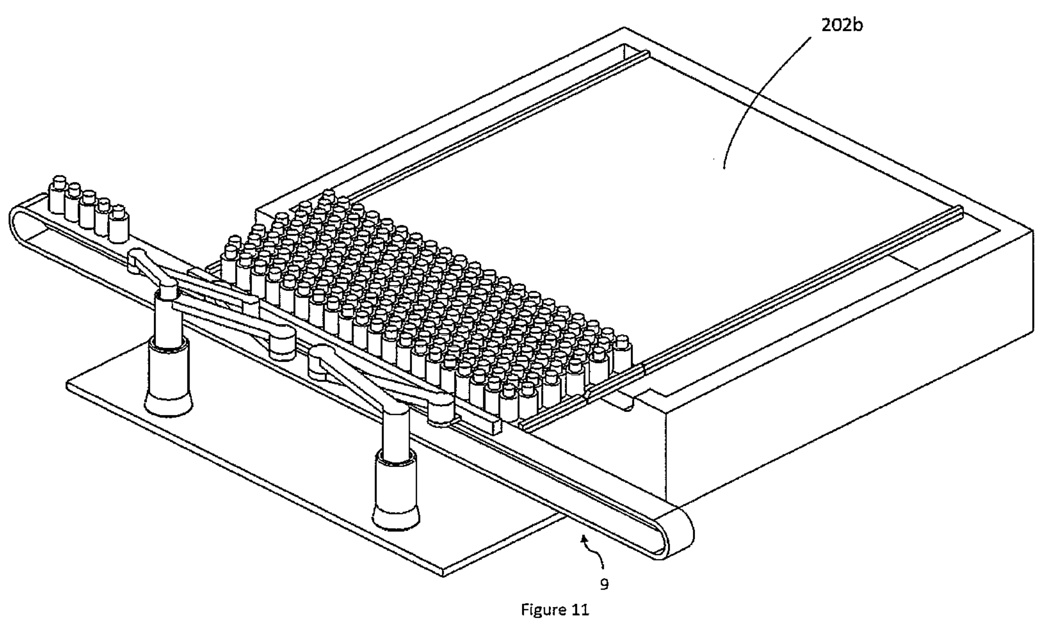
Figure 12:
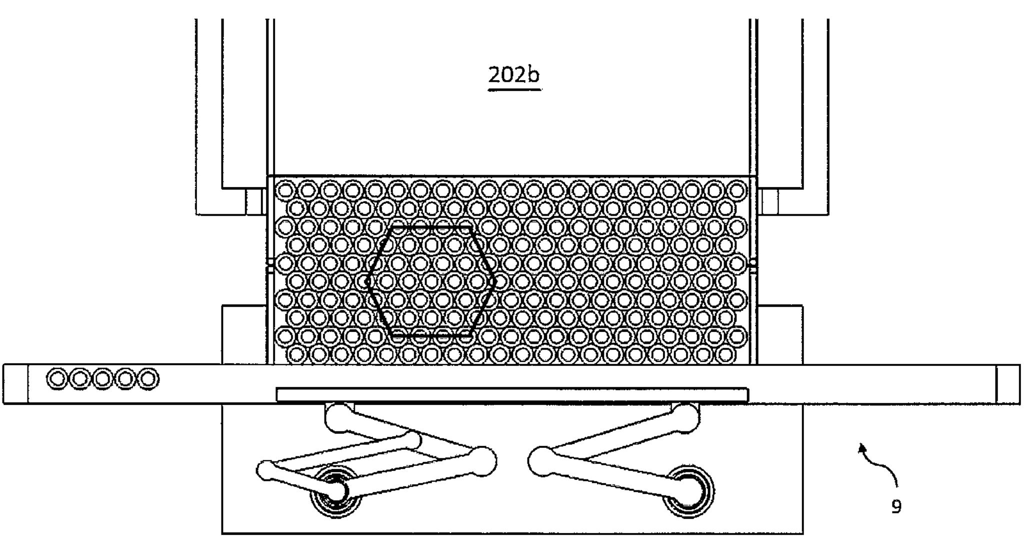
FIG. 12 shows a top view of the freeze drying installation of FIG. 11.

FIGS. 11 and 12 show the freeze drying installation 8 after 10 lines of containers 10 have been loaded. FIG. 12 is a top view to illustrate a typical arrangement where successive lines of containers 10 are loaded staggered so as to achieve a compact hexagonal distribution of containers 10 and therefore maximise capacity.

Figure 13:
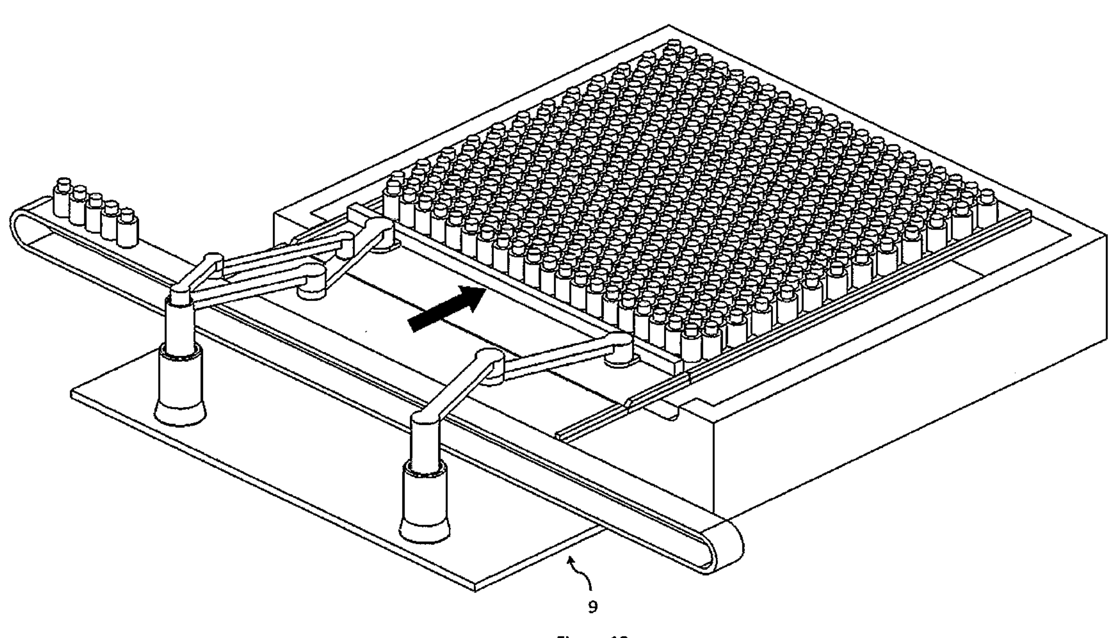

FIG. 13 shows the last step of loading of an individual standing platform 202*b*. Once enough lines of containers 10 have been accumulated, the device 9 extends in a long move to transfer the totality of containers 10 from the buffer platform 104 and bridging platform 105, through the chamber opening 201 to the standing platform 202*b* located inside the process chamber 200. Once this movement has been completed, the standing platform 202*b* is fully loaded.

Figure 14:
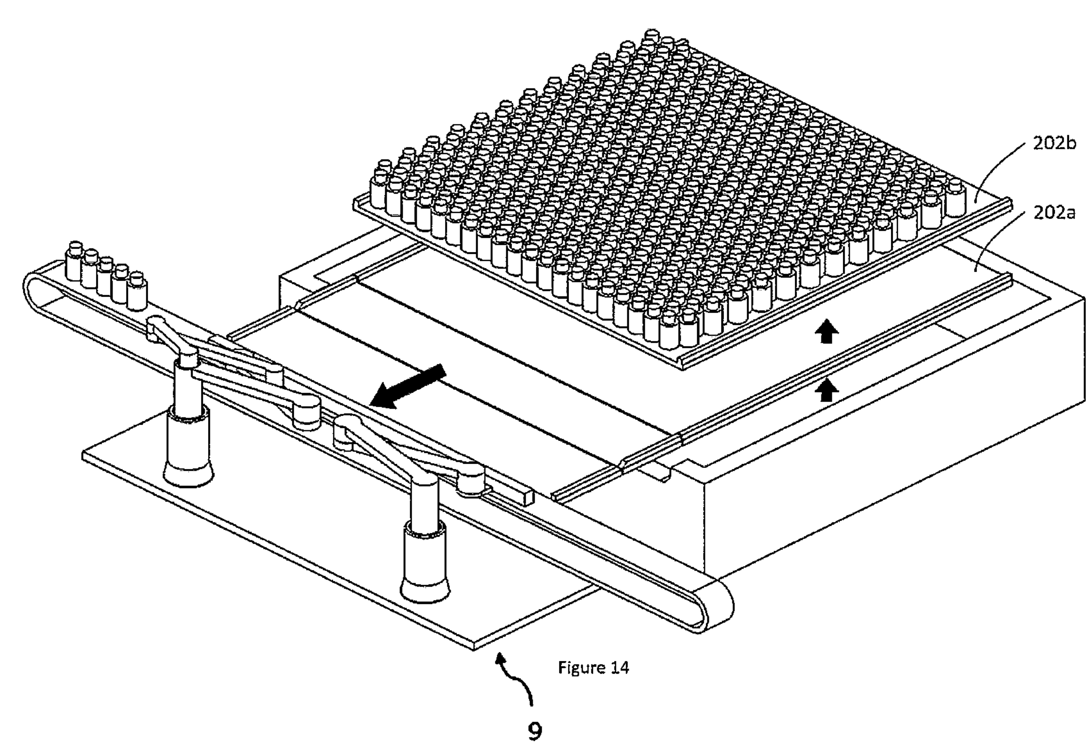

FIG. 14 shows the end of loading for one standing platform 202*b* and the preparation for the next empty standing platform 202*a*. The device 9 retracts and moves transfer bar 60 back to the starting or storage position outside the process chamber 200. The loaded standing platform 202*b* moves away vertically and the next empty standing platform 202*a* is moved in ready for loading. The process repeats for this and any successive empty standing platform as described in FIGS. 9 to 14 until the totality of standing platforms are loaded with containers 10.

The invention claimed is:

1. A freeze drying installation (8), including a device (9) for moving containers (10) along a surface (63) supporting the containers (10) to load and/or unload the containers (10) into a freeze dryer processing chamber (200), wherein the device (9) comprises a first articulated arm (102) and a second articulated arm (103), wherein the first articulated arm (102) comprises a first rigid upper arm (23) and a first rigid lower arm (21) connected to each other by a first rotary joint (22) and the second articulated arm (103) comprises a second rigid upper arm (46) and a second rigid lower arm (41) connected to each other by a second rotary joint (45), wherein an end of the first articulated arm (102) and an end of the second articulated arm (103) are connected to a rigid transfer bar (60) by a first articulated joint (20) and a second articulated joint (40), which are spaced apart from each other when seen along an extension axis (61) of the transfer bar (60), and wherein the first articulated arm (102) is arranged on a supporting platform (110) at a first connection point and the second articulated arm (103) is arranged on the supporting platform (110) at a second connection point, wherein the first articulated arm (102) and the second articulated arm (103) are driven by at least one driving unit (70) in a synchronised manner such that the transfer bar (60) is movable along a loading and/or unloading axis (62) to load or unload containers (10) into or from the freeze dryer processing chamber (200).

2. The freeze drying installation (8) according to claim 1, wherein the loading and/or unloading axis (62) is perpendicular to the extension axis (61) of the transfer bar (60).

3. The freeze drying installation (8) according to claim 1, wherein the first and second articulated arms (102, 103) move in opposite directions of rotation.

4. The freeze drying installation (8) according to claim 1, wherein, in a storage position of the first and second articulated arms (102, 103), the first rigid upper arm (46, 23) and the first rigid lower arm (41, 21) of each of the articulated arms (102, 103) are arranged in parallel or essentially in parallel with the extension axis (61) of the transfer bar (60).

5. The freeze drying installation (8) according to claim 1, wherein at least one of the articulated arms (102, 103) comprises a second upper (47) arm and a second lower arm (43) connected to each other by a second rotary joint (44).

6. The freeze drying installation (8) according to claim 5, wherein the second upper arm (47) is driven by the at least one driving unit (70) in such a manner that the second upper arm (47) and the first upper arm (46) of the same articulated arm (102, 103) move in opposite directions of rotation.

7. The freeze drying installation (8) according to claim 6, wherein the first upper arm (46) is driven around a first axis (49) and the second upper arm is driven around a second axis (48) and wherein the first axis (49) and the second axis (48) are concentric to each other.

8. The freeze drying installation (8) according to claim 1, wherein the articulated arms (102, 103) are arranged on a first side of the supporting platform (110) and the at least one driving unit (70) is arranged on a second side of the supporting platform (110) which is opposite the first side.

9. The freeze drying installation (8) according to claim 8, wherein the first side is part of a classified process area and the second side is outside of the classified process area.

10. The freeze drying installation (8) according to claim 1, wherein the containers (10) are vials.

11. The freeze drying installation (8) according to claim 1, wherein the driving unit (70) moves a first shaft (72) that is attached to a pulley (77) and a gear wheel (75), wherein the pulley (77) transfers a rotation of the driving unit (70) to the first articulated arm (102) via a second shaft (49).

12. The freeze drying installation (8) according to claim 11, wherein the second shaft (49) is connected to a second pulley (53) that rotates with the second shaft (49), wherein the second pulley (53) is connected to a third pulley (26), wherein the third pulley (26) transfers rotation from the driving unit (70) to the second articulated arm (103) via a third shaft (24).

* * * * *